US012769473B2

(12) United States Patent
Jiang et al.

(10) Patent No.: US 12,769,473 B2
(45) Date of Patent: Oct. 20, 2026

(54) AUTOMATED PORT SELECTION FOR DATA MIGRATION

(71) Applicant: Dell Products L.P., Round Rock, TX (US)

(72) Inventors: Xuedong Jiang, Andover, MA (US); Paul Bradley, Macroom (IE)

(73) Assignee: Dell Products L.P., Round Rock, TX (US)

( * ) Notice: Subject to any disclaimer, the term of this patent is extended or adjusted under 35 U.S.C. 154(b) by 8 days.

(21) Appl. No.: 19/098,085

(22) Filed: Apr. 2, 2025

(65) Prior Publication Data

US 2026/0310368 A1 Oct. 8, 2026

(51) Int. Cl.
*G06F 3/06* (2006.01)

(52) U.S. Cl.
CPC .......... *G06F 3/0647* (2013.01); *G06F 3/0604* (2013.01); *G06F 3/0679* (2013.01)

(58) Field of Classification Search
CPC ..... G06F 3/0647; G06F 3/0604; G06F 3/0679
See application file for complete search history.

(56) References Cited

U.S. PATENT DOCUMENTS

| | | | | |
|---|---|---|---|---|
| 6,658,540 | B1 | 12/2003 | Sicola et al. | |
| 7,831,709 | B1 | 11/2010 | Ham et al. | |
| 8,467,294 | B2 | 6/2013 | Raman et al. | |
| 8,621,101 | B1 | 12/2013 | Starr et al. | |
| 9,058,119 | B1 * | 6/2015 | Ray, III | H04L 12/00 |
| 11,086,522 | B1 * | 8/2021 | Jiang | G06F 3/0611 |
| 2004/0205089 | A1 * | 10/2004 | Alon | H04L 41/0873 |
| 2008/0301333 | A1 * | 12/2008 | Butler | H04L 67/1023 710/38 |
| 2009/0043822 | A1 * | 2/2009 | Sarkar | G06F 3/0653 |
| 2012/0216005 | A1 * | 8/2012 | Naito | G06F 3/067 711/E12.002 |
| 2019/0288933 | A1 * | 9/2019 | Barzik | G06F 3/0607 |
| 2023/0252432 | A1 * | 8/2023 | Deible | G06F 16/9024 705/69 |

* cited by examiner

*Primary Examiner* — Edward J Dudek, Jr.
(74) *Attorney, Agent, or Firm* — Krishnendu Gupta; Nikhil Patel

(57) ABSTRACT

One or more aspects of the present disclosure relate to optimizing port selection in ongoing data migration between storage arrays. Embodiments probe eligible ports between source and target arrays to discover connectivity and build a graph representing port connectivity by modeling directors as super nodes containing port nodes. Using a constrained optimization model, the embodiments find minimum cost augmenting paths while maintaining path diversity across directors. The embodiments add ports to active migration sessions by pruning the graph to remove used edges and ineligible nodes. Enhanced capabilities include selecting multiple ports per director while preserving diversity, implementing asymmetric fan-in/fan-out configurations for arrays with different port densities, and providing flexible port-sharing options. The embodiments automatically discover and validate paths, manage port selection policies, and non-disruptively modify remote data facility groups to optimize bandwidth and redundancy during data migration.

20 Claims, 7 Drawing Sheets

AUTOMATED PORT SELECTION FOR DATA MIGRATION

BACKGROUND

Storage arrays employ diverse communication paths between source and target arrays to enable high-performance data migration and replication. Director boards containing multiple ports can be configured for Fibre Channel and Gigabit Ethernet connectivity. These arrays support sophisticated port selection techniques that establish redundant paths while maintaining path diversity to prevent single points of failure. The technology enables arrays to be connected within a data center, across metropolitan areas, or over wide area networks using various transport protocols. Modern high-density directors can support multiple ports with significantly higher transmission rates, allowing for increased bandwidth aggregation and improved throughput for data movement between arrays. The port selection mechanisms ensure optimal utilization of available bandwidth while maintaining path diversity through the network infrastructure.

SUMMARY

One or more aspects of the present disclosure relate to optimizing port selection in ongoing data migration between storage arrays. In embodiments, eligible ports between a source array and a target array are probed to discover connectivity. A graph representing port connectivity between the arrays is built by representing each director on the source array and the target array as a super node containing port nodes. The graph is pruned by removing edges used by an ongoing migration session and removing ineligible nodes. A minimum cost augmenting path is found in the pruned graph. A set of selected ports is expanded using the minimum cost path. Whether sufficient diverse paths are found is validated. A remote data facility (RDF) group is modified using the set of selected ports.

In embodiments, edges corresponding to director ports already used in the ongoing migration session can be removed. In addition, nodes that do not meet diversity constraints between the source and target arrays can be removed using one or more port selection policies.

In embodiments, each director can be represented as a super node. Additionally, each port on a director can be represented as a node within the corresponding super node. Further, nodes can be connected based on discovered connectivity between ports.

In embodiments, a minimum number of ports to be added can be received. In addition, a maximum number of ports to be added can be received. Further, whether the selected set of ports meets the minimum and maximum constraints can be validated.

In embodiments, a directed graph with unmatched links from source to target nodes can be built. In addition, dummy source and sink nodes can be added. Further, the minimum cost path between the source and target nodes can be found.

In embodiments, multiple ports can be selected from a single director. Additionally, path diversity across directors/ports can be maintained, depending on the chosen policy.

In embodiments, asymmetric port selection between source and target arrays can be implemented. In addition, different numbers of ports on source and target arrays can be selected. Further, equivalent aggregate bandwidth between source and target arrays can be maintained.

In embodiments, a fan-out configuration with minimum ports on the source array and more ports on the target array or a fan-in configuration with more ports on the source array and minimum ports on the target array can be implemented.

In embodiments, ports can be selected according to one of the policies: exclusive use with ports not shared with any configured sessions, inactive sharing with ports shared with inactive sessions, or full sharing with ports shared with any active or inactive sessions.

In embodiments, mixing of different port types within the same RDF group can be prevented. Additionally, less preferred port types can be selected if insufficient preferred type ports are available. Further, the RDF group can be non-disruptively modified by adding newly discovered ports and pruning failed ports from the RDF group Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

Figure 1:
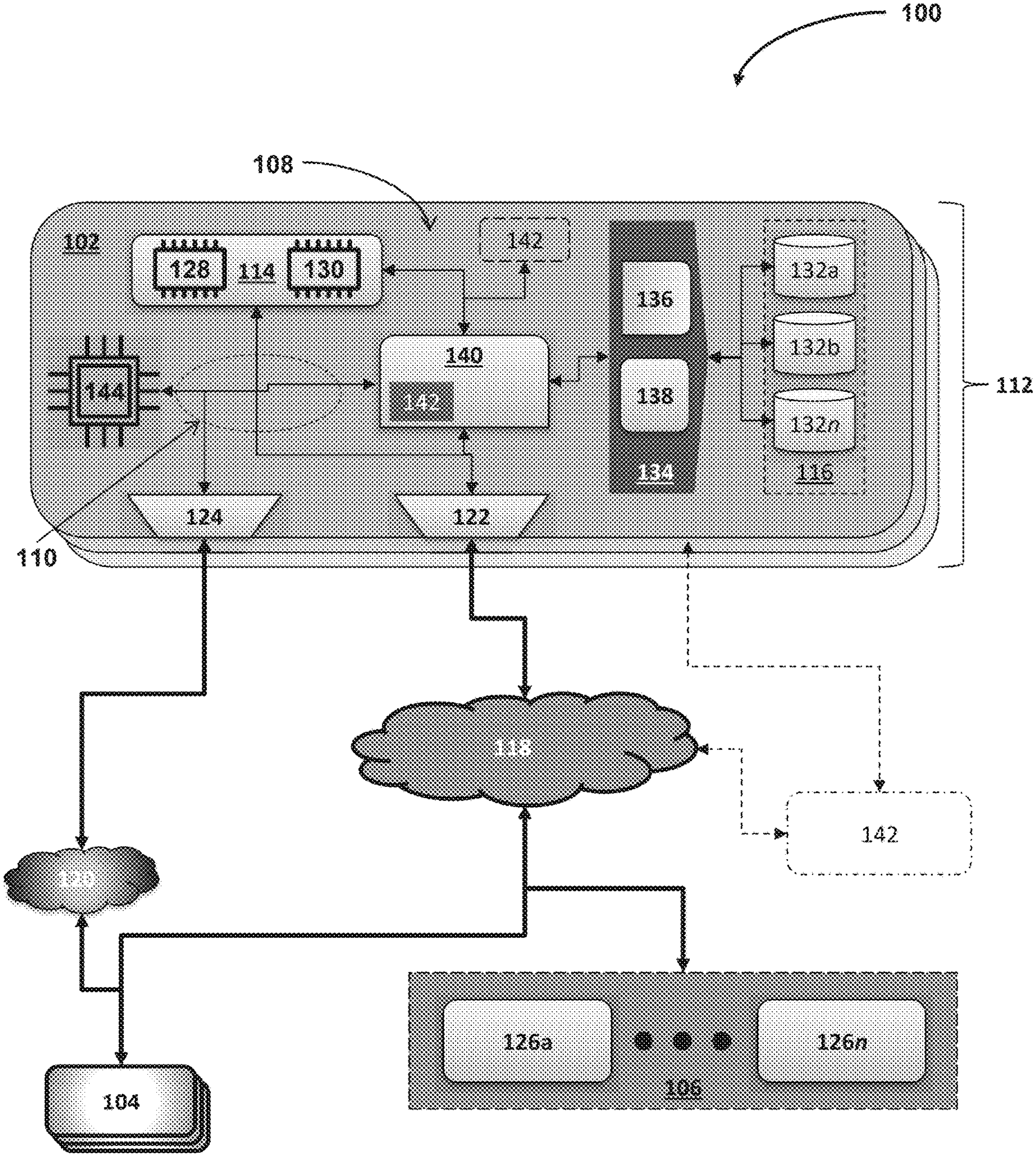
FIG. 1 illustrates a distributed network environment in accordance with embodiments of the present disclosure.

Storage arrays utilize director ports to enable data migration between source and target arrays through diverse network paths. Non-disruptive Data Migration (NDM) enables organizations to migrate application workloads between arrays without interrupting user 10 operations. With the increasing size of application datasets, migration processes can take multiple days to complete, during which network congestion or component failures may reduce throughput on the selected paths.

Previous approaches focused on selecting initial ports before starting migration sessions. These methods selected director ports with minimum cost while satisfying diversity criteria. The diversity requirements ensure redundant paths do not share physical links or ports between arrays, preventing single points of failure from affecting multiple paths.

While users can manually add ports to an RDF group to increase bandwidth, this process requires detailed system knowledge and is prone to errors. This manual intervention conflicts with NDM's goal of hiding system complexity from users. Additionally, existing implementations select only one port per director, even when multiple ports are available, which limits the potential bandwidth that can be utilized from high-density directors in newer generation arrays.

Embodiments of the present disclosure address these challenges through an enhanced port selection procedure that can dynamically modify paths for ongoing migration sessions. The procedure probes eligible ports between source and target arrays to discover connectivity and builds a graph representation where directors are modeled as super nodes containing port nodes. By pruning edges used by the ongoing session and removing ineligible nodes, the system can find minimum cost augmenting paths to expand the set of selected ports while maintaining diversity requirements.

The enhanced procedure supports multiple advanced configurations. For newer generation arrays with high-density directors supporting multiple high-speed ports, the system can select multiple ports per director while preserving path diversity requirements. Asymmetric port selection enables fan-in and fan-out configurations, where fan-out selects the minimum ports on the source and more ports on the target, while fan-in reverses this arrangement. In both cases, the system maintains equivalent aggregate bandwidth across the arrays.

The port selection procedure offers flexible sharing options between sessions through three distinct modes: exclusive use, where ports are not shared with any configured sessions; sharing with inactive sessions only; and full sharing with any active or inactive sessions. The procedure implements these capabilities through a modified optimization model that introduces port-level diversity constraints in addition to the existing director-level requirements. A matching technique iteratively expands the set of selected ports using minimum cost augmenting paths, ensuring the eventual solution optimizes both cost and diversity.

For ongoing migration sessions, the procedure can detect component failures or congestion and automatically identify new diverse paths to maintain or improve throughput. This self-healing capability enables migrations to continue uninterrupted, even when network conditions change. The automated approach preserves NDM's goal of abstracting system complexity while enabling dynamic bandwidth adjustment to optimize migration performance.

The enhanced port selection procedure integrates with existing NDM frameworks to provide a comprehensive solution for managing data migration between arrays. By automating path selection and supporting advanced configurations, the system reduces operational complexity while maximizing the utilization of available network resources. This enables organizations to efficiently move large datasets between arrays while maintaining high availability and performance requirements. The procedure supports both Fibre Channel and Gigabit Ethernet ports, although they cannot be mixed within the same RDF group. It allows users to specify port type preferences with a fallback to less preferred types if necessary.

The optimization model underlying the port selection procedure represents the network topology as a bipartite graph, where nodes correspond to ports and super-nodes represent directors. The model aims to minimize the cost across selected paths while ensuring that constraints on path diversity and bandwidth requirements are satisfied. For asymmetric configurations, additional constraints ensure the proper distribution of ports across directors while maintaining the required level of path diversity.

The implementation includes configurable parameters such as minimum and maximum numbers of ports to be added, allowing users to control the scale of path augmentation. The procedure handles port selection failures gracefully by returning appropriate error conditions when sufficient diverse paths cannot be found. This robust error handling, combined with the automated path discovery and selection, provides a reliable foundation for managing complex data migration scenarios.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110, such as Fibre Channels, buses, and communication modules, that communicatively couple the components 108. Furthermore, the distributed network environment 100 can define an array cluster 112, comprising the storage array 102 and one or more additional storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and others. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Furthermore, the network 118 or the remote network 120 can have a network architecture that enables networked devices to send and receive electronic communications using a specific communications protocol. For example, the network architecture can define a storage area network (SAN), a local area network (LAN), a wide area network (WAN) (e.g., the Internet), an Explicit Congestion Notification (ECN)—enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or the remote network 120 using one or more network interfaces. The network interface can include a wired or wireless connection interface, a bus, a data link, and the like. For example, a host adapter (HA 122), such as a Fibre Channel Adapter (FA) and the like, can connect the storage array 102 to the network 118 (e.g., a Storage Area Network or SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, and infrared light beams, among others. The communication nodes can also include switching equipment, phone lines, repeaters, multiplexers, and satellites. Furthermore, the network 118 or remote network 120 can include a network bridge that enables cross-network communication between, for example, the network 118 and the remote network 120.

In embodiments, hosts 106 connected to the network 118 can include client machines 126*a-n*, running one or more applications. The applications can require one or more of the storage array's services. Accordingly, each application can send one or more input/output (IO) messages (e.g., a read/write request or other storage service-related request) to the storage array 102 over the network 118. Furthermore, the 10 messages can include metadata that defines performance requirements according to a service level agreement (SLA) between hosts 106 and the storage array provider.

In embodiments, the storage array 102 can include a memory 114, such as volatile or nonvolatile memory. Furthermore, volatile and nonvolatile memory can include random-access memory (RAM), dynamic random-access memory (DRAM), static random-access memory (SRAM), and the like. Moreover, each memory type can have distinct performance characteristics, such as speed corresponding to reading or writing data. For instance, the types of memory can include register, shared, constant, user-defined, and the like. Furthermore, in embodiments, the memory 114 can include global memory (GM 128) that can cache 10 messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and one or more GPUs (graphical processing units).

Additionally, the storage array 102 can provide its distributed storage services using persistent storage 116. For example, the persistent storage 116 can include multiple thin-data devices (TDATs) such as persistent storage drives 132*a-n*. Furthermore, each TDAT can have distinct performance capabilities, such as read/write speeds, similar to those of hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136), such as a storage device controller, a flash drive interface 138, and the like, that control access to the array's persistent storage 116, including storage devices 132*a-n*.

Likewise, the storage array 102 can include an Enginuity Data Services processor (EDS 140) that can manage access to the array's memory 114. Furthermore, the EDS 140 can perform one or more memory and storage self-optimizing operations (e.g., utilizing one or more machine learning techniques) that enable rapid data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126*a-n*) remote or distributed storage services by virtualizing the storage array's memory and storage resources (memory 114 and persistent storage 116, respectively).

In embodiments, the storage array 102 can also include a controller 142 (e.g., a management system controller) that resides either externally from or within the storage array 102 and one or more of its components 108. When external to the storage array 102, the controller 142 can communicate with the storage array 102 using any known communication protocol or connection. For example, the communication connections can include a serial port, parallel port, or a network interface card (e.g., Ethernet). Furthermore, the controller 142 can include logic or circuitry that performs one or more storage-related services. For example, the controller 142 can have an architecture designed to manage the storage array's computing, processing, storage, and memory resources as described in greater detail herein.

Figure 2:
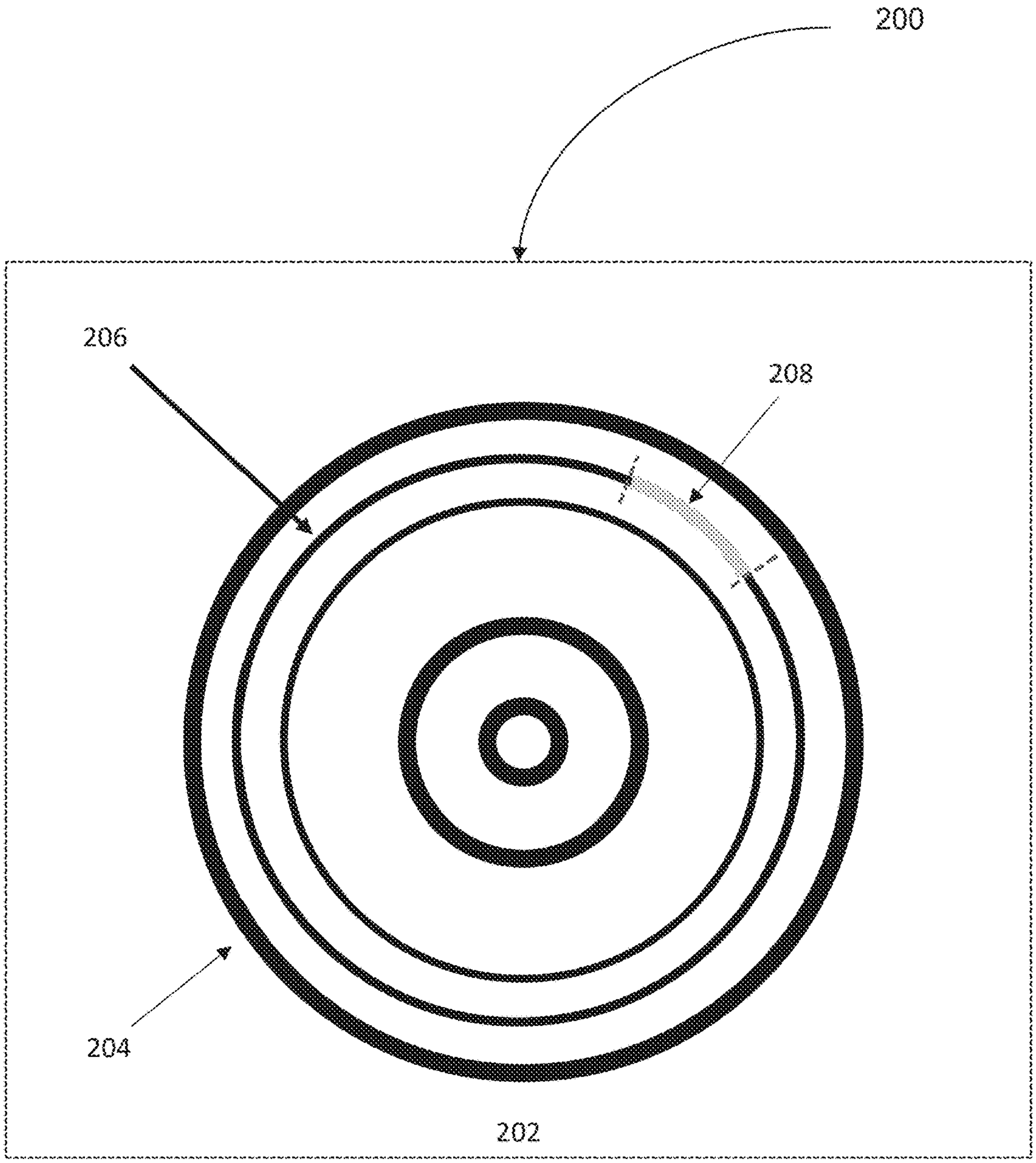
FIG. 2 is a cross-sectional view of a storage device in accordance with embodiments of the present disclosure.

Regarding FIG. 2, the storage array's EDS 140 can virtualize the array's persistent storage 116. Specifically, the EDS 140 can virtualize a storage device 200, which is substantially like one or more of the storage devices 132*a-n*. For example, the EDS 140 can provide a host, such as a client machine 126*a*, with a virtual storage device (e.g., a thin device (TDEV)) that logically represents zero or more portions of each storage device 132*a-n*. For example, the EDS 140 can establish a logical track using zero or more physical address spaces from each of the storage devices 132*a-n*. Specifically, the EDS 140 can establish a continuous set of logical block addresses (LBA) using physical address spaces from the storage devices 132*a-n*. Thus, each (LBA) represents a corresponding physical address space from one of the storage devices 132*a-n*. For example, a track can include 256 LBAs, amounting to 128kb of physical storage space. Further, the EDS 140 can establish the TDEV using several tracks based on the desired storage capacity of the TDEV. The EDS 140 can also establish extents that logically define a group of tracks.

In embodiments, the EDS 140 can provide each TDEV with a unique identifier (ID), such as a target ID (TID). Additionally, EDS 140 can establish a logical unit number (LUN) that maps each track of a TDEV to its corresponding physical track location using pointers. Further, the EDS 140 can also generate a searchable data structure, mapping logical storage representations to their corresponding physical address spaces. Thus, EDS 100 can enable the HA 122 to present the hosts 106 with the logical storage representations based on host or application performance requirements.

For example, the persistent storage 116 can include a hard disk drive (HDD) 202 with stacks of cylinders 204. Like a vinyl record's grooves, each cylinder 204 can include one or more tracks 206. Each track 206 can include continuous sets of physical address spaces representing each of its sectors 208 (e.g., slices or portions thereof). The EDS 140 can assign a corresponding logical block address (LBA) to each slice or portion. The EDS 140 can also group sets of continuous LBAs to establish one or more tracks. Further, the EDS 140 can group a set of tracks to establish each extent of a virtual storage device (e.g., TDEV). Thus, each TDEV can include tracks and LBAs corresponding to one or more of the persistent storage 116 or portions thereof (e.g., tracks and address spaces).

As stated herein, the persistent storage 116 can have distinct performance capabilities. For example, an HDD architecture is known to skilled artisans as being slower than an SSD's architecture. Likewise, the array's memory 114 can include different memory types, each with distinct performance characteristics described herein. In embodiments, the EDS 140 can establish a storage or memory hierarchy based on the SLA and the performance characteristics of the array's memory and storage resources. For example, the SLA can include one or more Service Level Objectives (SLOs) specifying performance metric ranges (e.g., response times and uptimes) corresponding to the hosts' performance requirements.

Further, the SLO can specify service level (SL) tiers corresponding to each performance metric range and categories of data importance (e.g., critical, high, medium, low). For example, the SLA can map critical data types to an SL tier requiring the fastest response time. Thus, the storage array 102 can allocate the array's memory and storage resources based on the anticipated volume of 10 messages associated with each SL tier and the memory hierarchy.

For example, the EDS 140 can establish a hierarchy that includes one or more tiers (e.g., subsets of the array's storage and memory) with similar performance capabilities (e.g., response times and uptimes). Thus, the EDS 140 can establish fast memory and storage tiers to service host-identified critical and valuable data (e.g., Platinum, Diamond, and Gold SLs). In contrast, slow memory and storage tiers can service host-identified, non-critical, less valuable data (e.g., Silver and Bronze SLs). The EDS 140 can also define "fast" and "slow" performance metrics based on relative performance measurements of the array's memory 114 and persistent storage 116. Thus, the fast tiers can include memory 114 and persistent storage 116, with relative performance capabilities exceeding a first threshold. In contrast, slower tiers can include memory 114 and persistent storage 116, with relative performance capabilities falling below a second threshold. Further, the first and second thresholds can correspond to the same threshold.

Figure 3:
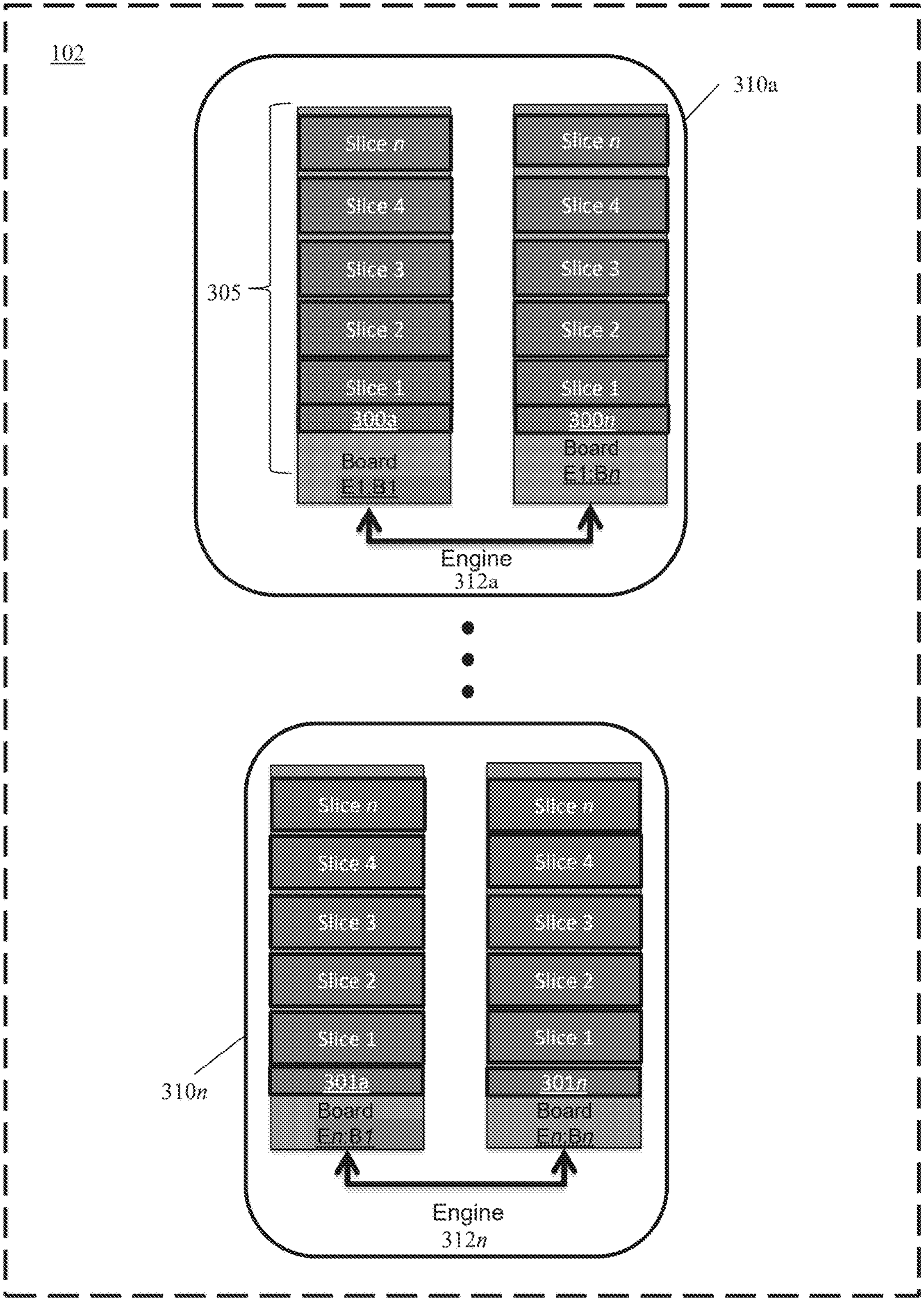
FIG. 3 is a block diagram of engines of a storage array, including director boards, in accordance with embodiments of the present disclosure.

Regarding FIG. 3, the storage array 102 includes engines 312*a-n* that deliver storage services. Each engine 312*a-n* has hardware circuitry or software components required to perform the storage services. Additionally, the array 102 can house each engine 312*a-n* in one or more of its shelves (e.g., housing) 310*a-n* that interface with the array's cabinet or rack (not shown).

In embodiments, each engine 312*a-n* can include director boards (boards) E1:B1-E1:Bn, En:B1-En:Bn. The boards E1:B1-E1:Bn, En:B1-En:Bn can have slices 305, each comprising hardware or software elements that perform specific storage services. Each board's slices 1-n can correspond to or emulate one or more of the storage array's components 108 described in FIG. 1. For example, each board's Slice 1 can correspond to or emulate the EDS 140 or controller 142 of FIG. 1. In embodiments, the slices 2-n can emulate one or more of the array's other components 101. Further, the boards B1-n can include memory 300*a-n*-301*a-n*, respectively. The memory 300*a-n*-301*a-n* can be dynamic random-access memory (DRAM).

In embodiments, each emulated EDS 140 (collectively referred to as "EDS 140") can provision its respective board with memory from the array's global memory 128. For example, the EDS 140 can uniformly carve out at least one global memory section into x-sized memory portions 300*a-n*/301*a-n*. Furthermore, the EDS 140 can size each global memory section or the x-sized memory portions 300*a-n*/301*a-n* to store data structure filters, such as cuckoo filters. The EDS 140 can size each global memory section or the x-sized portions based on the predicted metrics of an IO workload related to the amount and frequency of sequential 10 write patterns. For instance, the predicted metrics can define the amount of data the x-sized memory portions 300*a-n*-301*a-n* can be required to store.

Figure 4:
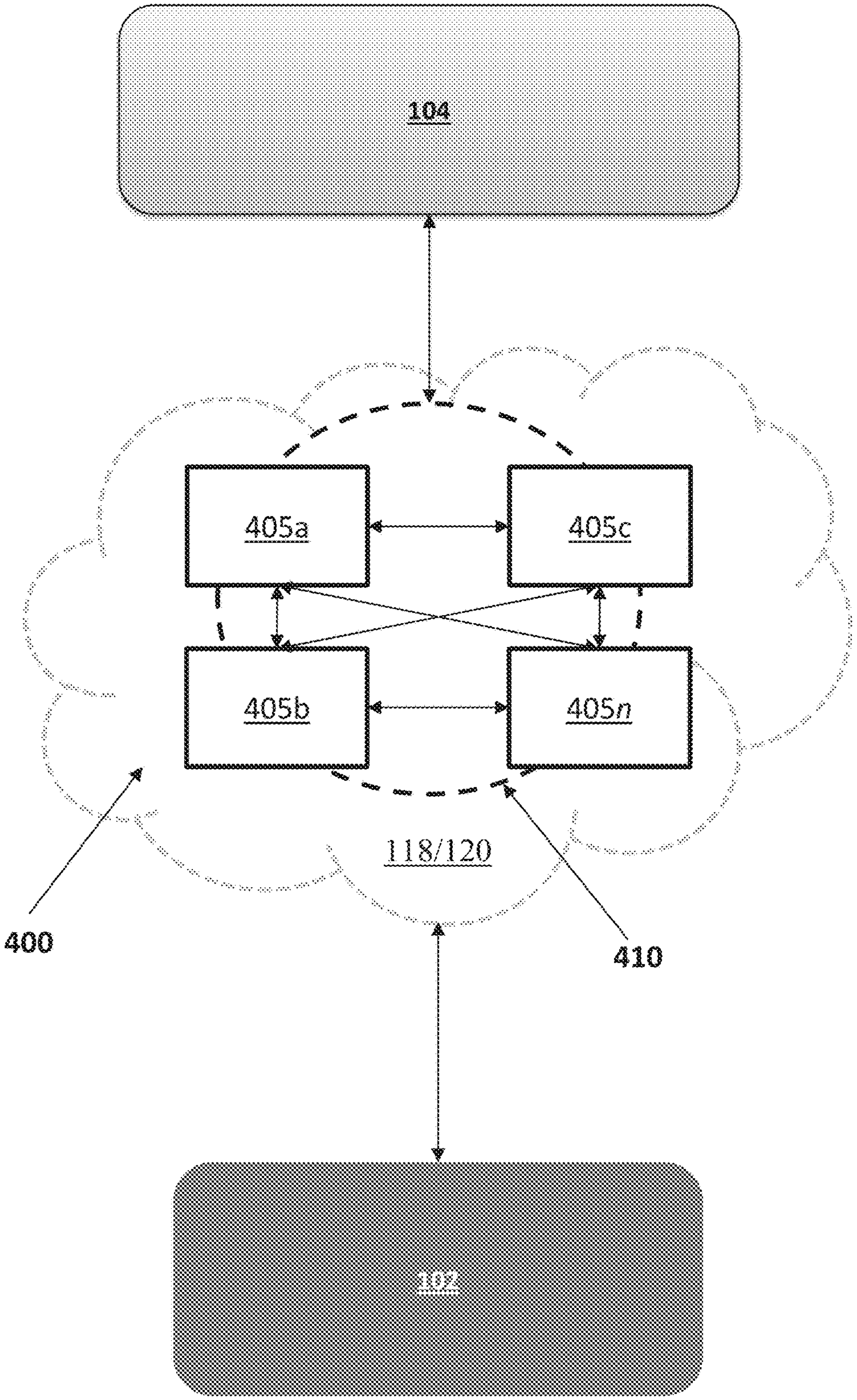
FIG. 4 is a block diagram of a communications network in accordance with embodiments of the present disclosure.

Regarding FIG. 4, a network (e.g., a SAN or remote network) 118/120 can include one or more interconnected nodes 405*a-n* that define the structure and flow of information between devices on the network 118/120 (i.e., network devices). For example, the network 118 can interconnect the nodes 405*a-n* using links 410. The links 410 allow the nodes 405*a-n* to exchange messages using one or more communications protocols. The communications protocols can define a method (e.g., rules, syntax, semantics, and the like) by which the nodes 405*a-n* can pass messages and signals to other networked devices. Further, the protocol can define a communications synchronization process and error recovery methods. The network 118/120 can implement the protocol using hardware, software, or a combination of both. The protocol's rules, syntax, and semantics can include, e.g., a circuit switching, message switching, or packet switching technique. In embodiments, the nodes 405*a-n* can comprise networking hardware, such as computing nodes (e.g., computers), servers, bridges, switches, hubs, and other similar devices.

The network 118/120 can arrange the nodes 405*a-n* to define one or more of the following network types: Chain Network (CHN), Y-Network (YN), Wheel Network (WN), Circle Network (CIRN), All-Channel Network (ACN), and the like, including a Star Network. In a CHN, the nodes 405*a-n* have a hierarchical relationship (e.g., topology) that requires communications to flow through a formal chain. In a YN, the nodes 405*a-n* have a topology resembling an upside-down 'Y' (e.g., information flows upward and downward through the hierarchy). In a WN, data flows to and from a networked device (e.g., array 102). In a CIRN, the nodes 405*a-n* have a topology that restricts the flow of information to and from one node to an adjacent node (e.g., a neighboring node). In embodiments, each node can have at most two adjacent nodes. In an ACN, the nodes 405*a-n* have a structure that allows communications to flow upward, downward, and laterally among each node. As illustrated, the network 118/120 can have an arrangement 400 consistent with an ACN. In embodiments, the network 118/120 can define one or more communication paths between a local storage array 102 and, e.g., a remote storage array 104, as described in greater detail herein.

Figure 5:
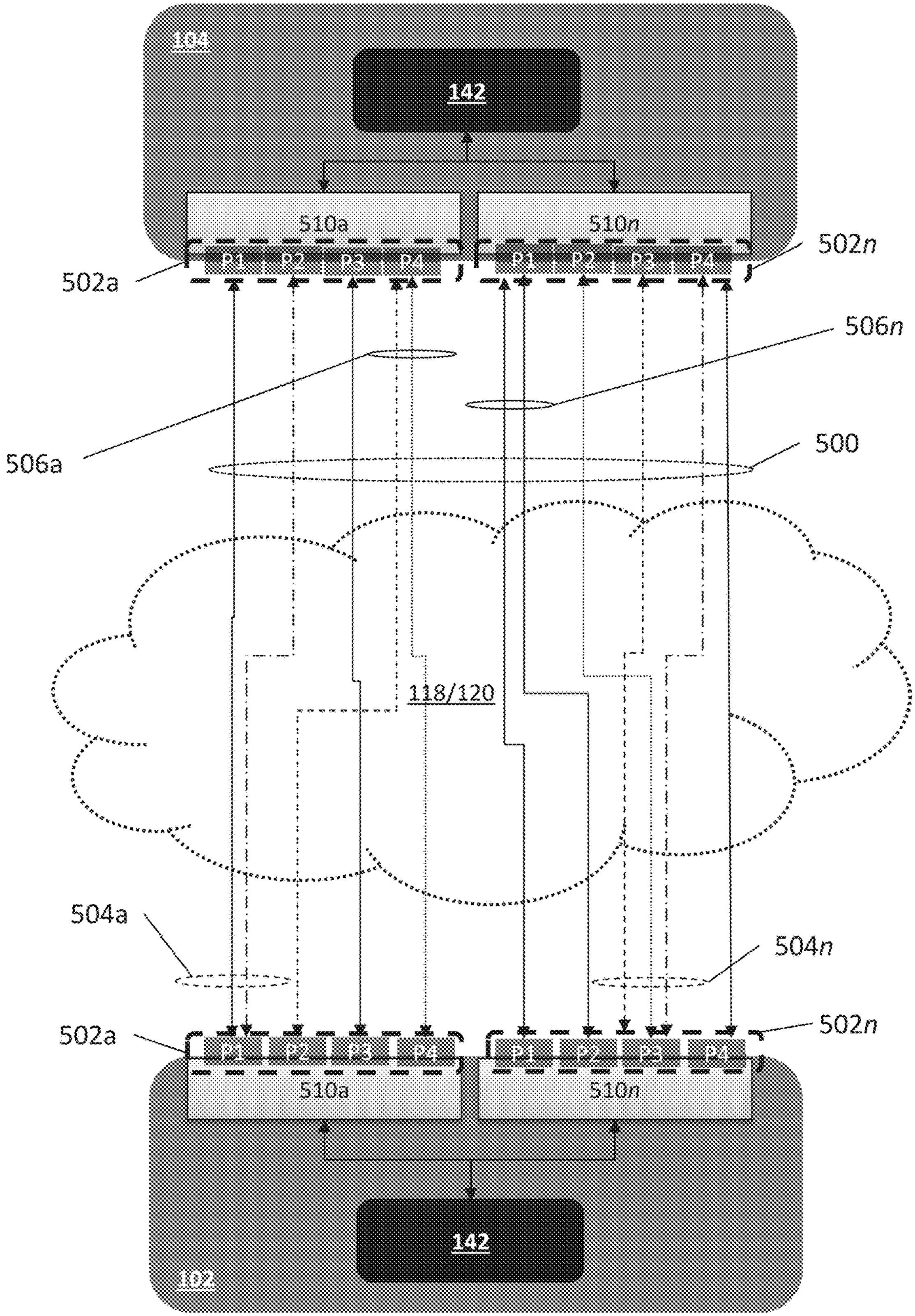
FIG. 5 is a block diagram of a replication communications network, including a storage array and a remote data facility (RDF) in accordance with embodiments of the present disclosure.

Regarding FIG. 5, a network 118/120 can include one or more interconnected nodes (e.g., switches 405*a-n* of FIG. 4) that define a structure and flow of information between devices on the network 118/120. In embodiments, the network 118/120 can define one or more paths 500 between a local storage array 102 and a remote storage array 104.

In embodiments, the network 118/120 can be configured in multiple deployment scenarios, including co-located arrays within a data center, metropolitan area networks, or wide area networks. The connectivity between the local storage array 102 and the remote storage array 104 can be established through diverse paths 500 to ensure high availability and performance for data migration. The diverse paths 500 can correspond to redundant paths that do not share physical links or ports between the arrays 102/104.

In embodiments, the paths 500 between the arrays 102/104 can be implemented using either Fibre Channel or Gigabit Ethernet ports; however, these cannot be mixed within the same RDF group, a logical construct that manages the connectivity and data paths between source and target storage arrays 102/104.

In embodiments, the local storage array 102 and the remote storage array 104 can include director boards 510*a-n* (e.g., substantially similar to director boards En:Bn of FIG. 3), each including a small input/output (IO) card (SLIC) 502*a-n*. Each SLIC can include multiple FC ports or Gigabit Ethernet ports (e.g., ports P1-4).

In embodiments, the local and remote storage arrays 102/104 can include a controller 142 that automatically discovers usable ports and their connectivity between the source and target arrays through a probing process. To establish paths between the arrays 102/104, the controller 142 probes the network 118/120 to discover connectivity between eligible ports P1-4 on both arrays 102/104. The controller 142 then creates the diverse paths 500 that do not share any physical links or ports between the arrays 102/104, ensuring that a single point of failure on one path does not affect other paths.

For wide-area network deployments, the controller 142 routes the paths 500 through different intermediate nodes and links (e.g., the nodes 405*a-n* and links 410 of FIG. 4) to maintain path diversity and prevent the shared fate of connections. The controller 142 validates path diversity by checking the connectivity information and routing between the ports P1-4. Although it may treat the intermediate network 118/120 as a "black box" in some cases, it still ensures path diversity through port selection.

Like other components of the network 118/120, the ports P1-4 on each SLIC 502*a-n* can be assigned unique world-wide names (WWNs) or IP addresses. For example, the SLICs 502*a-n* can provide an interface between the arrays 102/104 and the network 118/120. In embodiments, WWNs serve as unique identifiers in Fibre Channel networks, much like IP addresses in Ethernet networks. Each device (e.g., HBA port, switch port, storage array port) is assigned a unique WWN or IP address depending on the network type. The WWNs and IP addresses can identify each device and port in the network 118/120. Additionally, the WWNs and IP addresses can be used to create logical zones that define which devices can communicate with each other. Specifically, zoning techniques use WWNs to create logical groups of devices that are allowed to communicate. Furthermore, networked devices (e.g., arrays 102/104, switches 405*a-n* of FIG. 4, and the like) on the network 118/120 can implement multipathing techniques that utilize the WWNs or IP addresses to identify and manage multiple paths between the networked devices.

In embodiments, the controller 142 considers the bandwidth and performance characteristics of paths when establishing connections between the arrays 102/104. For example, newer generation arrays can support higher-density director boards 510*a-n* with multiple ports and higher transmission rates. (e.g., 10G/40G/100G). Accordingly, the controller 142 can configure asymmetric paths using fan-in or fan-out configurations to match bandwidth capabilities between arrays. Path bandwidth is balanced to avoid bottlenecks, ensuring symmetrical bandwidth on both sides of a connection.

For example, fan-in and fan-out configurations enable asymmetric port selection between source and target arrays 102/104 while maintaining equivalent aggregate bandwidth. In a fan-out configuration 504*a-n*, the source array 102 utilizes a minimum number of high-bandwidth ports, while the target array 104 employs multiple lower-bandwidth ports. For example, when migrating data between arrays, one 100G port on the source array 102 can connect to ten 10G ports on the target array, maintaining a symmetrical 100G bandwidth on both sides.

Conversely, in a fan-in configuration (506*a-n*), the source array 102 utilizes multiple lower-bandwidth ports that connect to fewer high-bandwidth ports on the target array 104. This allows, for instance, ten 10G ports on the source array 102 to connect to one 100G port on the target array 104.

These configurations are advantageous when arrays have different generations of hardware with varying port densities and speeds. For instance, the controller 142 can implement a port selection technique, ensuring that even with asymmetric configurations, the paths 500 maintain diversity requirements across the directors 510*a-n* and corresponding ports P1-4. This allows the controller 142 to spread the ports P1-4 across more directors 510*a-n* on one array than the other 104 while still maintaining equivalent aggregate bandwidth between the arrays 102/104.

In embodiments, the controller 142 automatically discovers and configures the paths 500, ensuring that no bandwidth bottlenecks occur due to mismatched port speeds. This flexibility is especially valuable when migrating data between older arrays with only lower-speed ports and newer arrays with higher-speed ports. The controller 142 can automatically configure the appropriate fan-in or fan-out arrangement to match the bandwidth capabilities while preserving path diversity requirements.

In embodiments, the controller 142 can establish RDF groups that manage the connectivity and data paths 500 between the source and target arrays 102/104. Each group can include a set of director ports that establish diverse paths for data migration while maintaining high availability and performance requirements.

In embodiments, the controller 142 can non-disruptively modify RDF groups to accommodate changes in the network environment. This includes adding new ports to increase bandwidth, removing failed paths, and rebalancing traffic across available paths. The ports within an RDF group must be of the same transport type—either all Fibre Channel or all Gigabit Ethernet ports, as mixing port types within the same group is not supported.

The group configuration supports different port-sharing options. Exclusive use dedicates ports solely to the migration session. Shared use with inactive sessions allows ports to be assigned to configured but non-active sessions. Full sharing enables ports to be used by any active or inactive sessions.

For newer generation arrays with high-density directors, RDF groups can be configured with multiple ports per director to increase throughput. The groups also support asymmetric configurations through fan-in or fan-out arrangements, where different numbers of ports can be selected on the source and target arrays while maintaining equivalent aggregate bandwidth.

When establishing or modifying an RDF group, the controller 142 automatically discovers usable ports P1-4 and their connectivity between the arrays 102/104 through a probing process. It then creates diverse paths that do not share any physical links or ports, ensuring that a single point of failure on one path does not affect other paths. The group configuration is managed through a constrained optimization model that selects ports with minimum cost while satisfying diversity requirements across directors and ports.

In embodiments, the controller 142 can modify the paths 500 for ongoing data migration sessions by applying an enhanced port selection technique that can add or remove paths 500 while maintaining diversity requirements. This enhancement addresses scenarios where component failures or network congestion reduce throughput during migration, allowing the controller 142 to automatically find and configure additional paths without disrupting the ongoing migration.

The controller 142 implements the technique by first probing eligible ports between the source and target arrays to discover connectivity. It then builds a graph where each director is represented as a super node containing multiple port nodes. The graph is pruned by removing edges that have already been used in the ongoing migration session and nodes that do not meet diversity constraints.

In embodiments, the controller 142 can initiate the port selection procedure by probing the network 118/120 using any known or yet-to-be-developed technique to establish connectivity between the arrays 102/104. It then builds a graph representing port connectivity with directors as super nodes and ports as individual nodes within those super nodes. The controller 142 prunes the graph by removing used edges and ineligible nodes, and assigns costs to the remaining nodes. After adding dummy source/sink nodes with zero-utilization links, it finds the minimum-cost augmenting paths using, e.g., a modified BFS (Breadth-First Search) technique.

Additionally, controller 142 can expand the selected port set if valid paths are found and validated against minimum path requirements. Once sufficient diverse paths are identified, it modifies the RDF group with the newly selected ports. The solution supports both Fibre Channel and Gigabit Ethernet ports, though these cannot be mixed within the same RDF group. Users can specify port type preferences, with the controller 142 falling back to less preferred types if insufficient preferred ports are available.

This enhancement enables the controller 142 to allocate additional bandwidth to ongoing migrations, remove failed paths from active sessions, maintain path diversity requirements, automatically discover and configure new paths, and non-disruptively modify existing RDF groups.

In embodiments, the controller 142 can implement the following optimization model for selecting a set of director ports P1-4 meeting the diversity criteria over directors and ports. Consider a bipartite graph G=(N, E), where N is the set of nodes formed by two disjoint subsets $N_s$ and $N_t$, and $n \in N_s$, $m \in N_t$ for all links $(n,m) \in E$. Each director 510*a-n* is a super node that has multiple nodes (e.g., the ports P1-4), each of which is a node. Each link indicates connectivity between ports. This differs from current naive models, where a node represents all ports on the same director. $D_s$ and $D_t$, are the sets of super nodes for the source and the target arrays 102/104, respectively. A bandwidth function $R_n$ and a cost function $C_n$ are defined for a node n. Note that a link is a logical concept that can be an abstraction of a physical path in a switched SAN or TCP/IP network 102/104 connecting two nodes, in which case the cost of a link is the maximum cost of the physical path. The objective is to select a set of nodes M with minimum cost:

$$\text{Minimize } C = \max_{n \in M} C_n \qquad \text{EQ. 1}$$

$$\text{s.t. } M = M_s \cup M_t \qquad \text{EQ. 2}$$

$$M_s \cap M_t = \emptyset \qquad \text{EQ. 3}$$

$$M_s \subseteq N_s \qquad \text{EQ. 4}$$

$$M_t \subseteq N_t \qquad \text{EQ. 5}$$

$$\sum_n \delta(n, m) = 1, \forall\, m \in M_t \qquad \text{EQ. 6}$$

$$\sum_m \delta(n, m) = 1, \forall\, n \in M_s \qquad \text{EQ. 7}$$

$$|M_t| = |M_s| = k_p \qquad \text{EQ. 8}$$

$$|D_s| = k_d \qquad \text{EQ. 9}$$

$$|D_t| \geq k_d \qquad \text{EQ. 10}$$

-continued $$\sum_m \rho(D_t, m) = \frac{|D_t|}{|M_t|}, \forall\, m \in M_t \qquad \text{EQ. 11}$$

$$\sum_n \rho(D_s, n) = \frac{|D_s|}{|M_s|}, \forall\, n \in M_s \qquad \text{EQ. 12}$$

where $\delta(n,m) \in \{0,1\}$, $\forall n \in N_s$, $\forall m \in N_t$ correspond to the connectivity function such that $\delta(n,m)$ is 1 if there is a link between nodes n and m, or 0 if there is no link between nodes n and m. $\rho(D_t,m) \in \{0,1\}$, $\forall m \in N_t$, $\rho(D_s,n) \in \{0,1\}$, $\forall n \in N_s$, are functions indicating whether a node belongs to a super node. $k_d>0$ is the minimum number of independent links between $D_s$ and $D_t$. $k_p>0$ is the minimum number of independent links between $N_s$ and $N_t$. The first two constraints imply that MS and Mt are disjoint subsets of M, where $M_s$ is the set of ports selected on the first array and $M_t$ the set of ports selected on the second array. The third and fourth constraints simply mean $M_s$ and $M_t$ is a subset of $N_s$ and $N_t$ respectively. The seventh, eighth, and ninth constraints imply that there are independent links between $M_s$ and $M_t$ for directors and ports, respectively. The last two constraints imply the selected ports must evenly spread across the selected directors.

A matching $E_M \subseteq E$ is a subset of links such that each node in N appears in at most one link in $E_M$, where M is the set of nodes. Node n is a free node if no link from $E_M$ is incident to n. A path P is a sequence of nodes, $n_1, n_2, \ldots, n_l$ where $(n_i, n_{i+1}) \in E$, $\forall 1 \leq i \leq l-1$. A path P is an alternating path regarding $E_M$, if for every pair of subsequent nodes in P, one of them is in $E_M$ and another one is not. A path P is an augmenting path, if P is an alternating path such that its start and end nodes are free. The simplest augmenting path is a link connecting two free nodes. The cost of a path is $$C_p = \max_{n \in p} C_n,$$

i.e., the maximum cost of the nodes in the path. The minimum cost nep augmenting path between a pair of nodes is an augmenting path with the minimum cost.

In embodiments, the controller 142 can implement a technique for finding the set of ports with minimum cost iteratively applies the port selection process through several key steps. The technique begins with an empty set EM and iteratively expands it by finding minimum cost augmenting paths. In each iteration, the technique searches for the minimum cost augmenting path P=p(G; EM). If no path is found (P=Ø), the technique breaks. Otherwise, it expands EM by adding the found path (EM=EM⊕(P).

The technique continues this process while |EM|<kd, where kd represents the minimum number of independent links between directors. After finding sufficient director-level paths, it prunes the graph by removing the selected ports and continues searching for additional paths while |EM|<kp, where kp represents the minimum number of port-level paths required.

To find each minimum cost augmenting path, the technique constructs a directed graph (G; EM) with unmatched links from source nodes Ns to target nodes Nt, and matched links from Nt back to Ns. The cost of each link is determined by taking the maximum cost of its two endpoint nodes. The technique then adds dummy source (s) and sink (t) nodes, along with zero-cost dummy links connecting them to free nodes in their respective node sets.

A modified version of Dijkstra's technique is employed to find the minimum cost augmenting path P=p(G; EM) between the dummy source and sink nodes. This process ensures that the eventual set M represents the optimal solution with minimum cost among all feasible selections. If the technique cannot find enough augmenting paths to meet the required criteria, it returns a failure indication.

The technique maintains path diversity requirements while minimizing costs by considering both director-level and port-level constraints. When successful, it returns the set M containing the optimal selection of ports that satisfies all diversity and cost requirements.

In embodiments, the controller 142 can implement three distinct port sharing options when selecting ports for augmented paths during data migration sessions.

The first option is exclusive use, where selected ports are not being used by any configured sessions. This ensures the ports are solely dedicated to the migration session being provisioned or modified, avoiding any potential resource contention with other sessions.

The second option allows inactive sharing, where ports are not being used by any active sessions but may be assigned to some configured but inactive sessions. This provides flexibility by allowing the selected ports to be shared with other sessions that are not currently active, enabling better resource utilization while still maintaining performance for the active migration.

The third option enables full sharing, allowing ports to be used by existing sessions. This option allows port sharing with any configured sessions, whether active or inactive, providing maximum flexibility in port selection and resource utilization.

Figure 6:
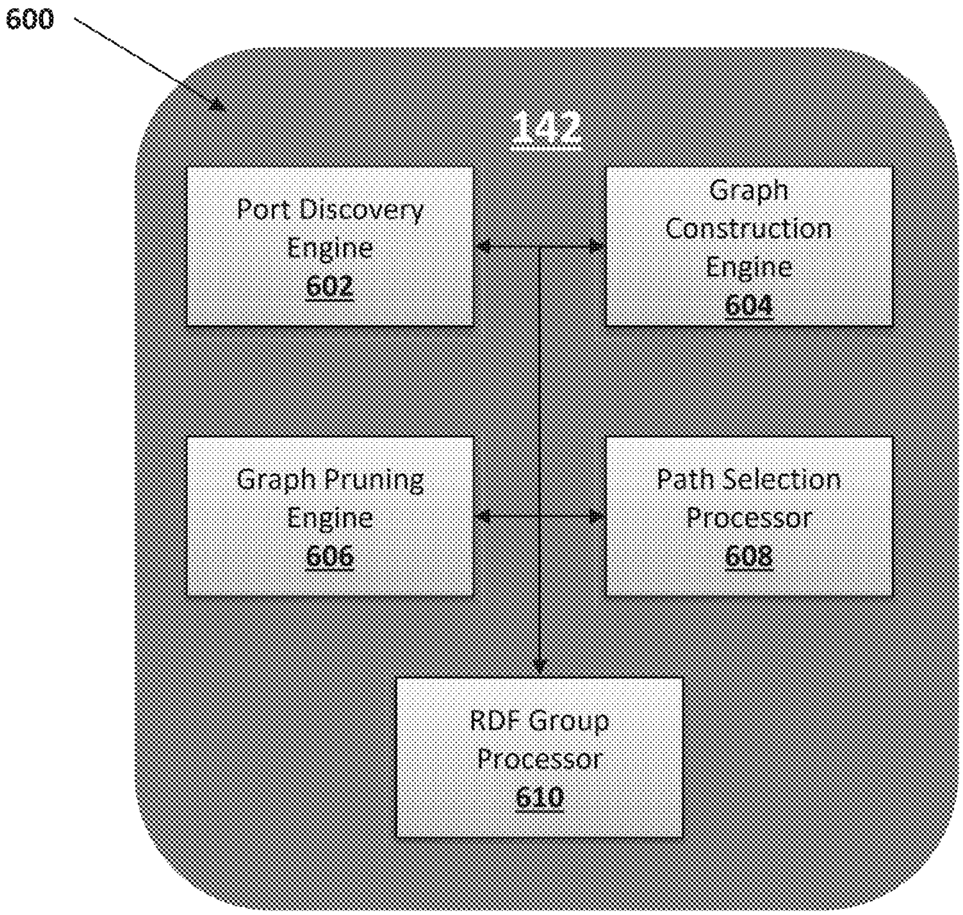
FIG. 6 is a block diagram of a controller in accordance with embodiments of the present disclosure.

These port-sharing schemes are particularly relevant for remote replication sessions that may or may not be used for data migration. The options provide users with the flexibility to balance between dedicated resources and shared utilization based on their specific requirements and system configuration. The selection of the appropriate sharing option depends on factors such as the criticality of the migration, available port resources, and the presence of other configured sessions in the environment Regarding FIG. 6, a storage array (e.g., the storage array 102 of FIG. 1) can include a controller 142, including logic, hardware, and circuitry 600 that optimizes port selection in ongoing data migration between storage arrays.

In embodiments, the controller 142 can include a port discovery engine 602 that is responsible for probing and discovering eligible ports and their connectivity between source and target storage arrays during ongoing data migration sessions. The port discovery engine 602 implements an automated discovery mechanism that eliminates the need for manual port selection and configuration by users.

The port discovery engine 602 takes as input the source and target array identifiers (e.g., WWNs or IP addresses) and performs network probing to discover the physical connectivity topology between the arrays. For each director on both arrays, it identifies all available ports and their current utilization states. The engine supports both Fibre Channel and Gigabit Ethernet ports, though these cannot be mixed within the same RDF group.

The port discovery engine 602 determines port eligibility based on the current port usage status (unused, configured but inactive, or active), port sharing capabilities, port types, and speeds, as well as physical connectivity between the source and target arrays and existing RDF group configurations.

The port discovery engine 602 implements sophisticated probing algorithms to identify all physical connections between array ports, detect port speeds and supported protocols, determine current port utilization and availability, and map the network topology between arrays, including intermediate network paths.

For arrays connected over wide area or metro networks, the port discovery engine 602 can identify diverse physical paths that do not share common points of failure. This is critical for maintaining redundancy and fault tolerance during migration.

The port discovery engine 602 supports the discovery of high-density directors available in newer arrays that contain multiple high-speed ports. This enables the identification of ports that can be aggregated together to increase migration bandwidth while preserving path diversity requirements.

The discovered port information is used to construct a graph representation where directors are represented as super nodes, individual ports are represented as nodes within their director super nodes, physical connectivity between ports is represented as edges, and cost metrics are assigned based on port utilization and performance characteristics.

The port discovery engine 602 provides a comprehensive mapping of eligible ports between source and target arrays, a connectivity graph with directors as super nodes that contain port nodes, port cost and utilization metrics for path selection, and port sharing capabilities and constraints.

This discovered topology, and port information enables the subsequent graph construction and path selection engines to identify optimal diverse paths for ongoing migration sessions while maintaining redundancy requirements. The port discovery engine's automated discovery capabilities eliminate error-prone manual port selection while ensuring optimal use of available network bandwidth.

In embodiments, the controller 142 can include a graph construction engine 604 that receives port connectivity information from the port discovery engine 602 and constructs a graph representation of the network topology between source and target storage arrays. The graph construction engine 604 implements a sophisticated graph building algorithm that represents directors as super nodes and their individual ports as child nodes within the corresponding super node structure.

When constructing the graph, graph construction engine 604 creates a bipartite graph G=(N, E), where N represents the set of nodes formed by two disjoint subsets Ns and Nt corresponding to the source and target arrays respectively. Each director on both arrays is modeled as a super node that can contain multiple port nodes, with edges representing physical connectivity between ports.

The graph construction engine 604 assigns cost metrics to each node based on information collected by the management software, including port utilization and performance characteristics. These cost metrics are critical for the subsequent path selection process to identify optimal diverse paths between arrays.

For arrays connected over wide area or metro networks, the graph construction engine 604 models the network topology to capture diverse physical paths that do not share common points of failure. The graph construction engine 604 supports both Fibre Channel and Gigabit Ethernet ports, though these cannot be mixed within the same RDF group.

The graph construction engine 604 implements special handling for high-density directors available in newer arrays that contain multiple high-speed ports. The graph representation enables the aggregation of multiple ports from a single director, while maintaining path diversity requirements across directors.

The constructed graph serves as input for subsequent graph pruning operations that remove edges corresponding to ports already in use by ongoing migration sessions and nodes that do not meet diversity constraints. The graph construction engine 60 adds dummy source and sink nodes to the graph along with corresponding dummy links to facilitate path-finding algorithms.

The graph construction engine 604 provides critical functionality for enabling non-disruptive port selection by creating an accurate graph representation that captures both the physical connectivity topology and logical constraints of the storage network. This graph structure enables the path selection engine to identify optimal diverse paths while maintaining redundancy requirements for ongoing migration sessions.

The engine's graph construction capabilities eliminate error-prone manual port selection while ensuring optimal use of available network bandwidth through its sophisticated modeling of directors, ports, and their interconnections. The resulting graph representation provides the foundation for automated discovery and configuration of optimal migration paths In embodiments, the controller 142 can include a graph pruning engine 606 that receives the constructed graph from the graph construction engine 604 and performs critical pruning operations to prepare the graph for path selection during ongoing data migration sessions. The pruning operations remove edges corresponding to ports already in use by the ongoing migration session and nodes that do not meet the diversity constraints between source and target arrays.

When processing an ongoing migration session, the graph pruning engine 606 first identifies all edges in the graph that represent ports currently being used for data migration. These edges are systematically removed from the graph to ensure they are not selected again for additional paths. The graph pruning engine 606 also evaluates each node against the configured diversity constraints to identify and remove nodes that would violate these requirements if selected.

The graph pruning engine 606 implements sophisticated pruning algorithms that maintain path diversity requirements while supporting both Fibre Channel and Gigabit Ethernet ports. For high-density directors available in newer arrays, the pruning operations preserve the ability to select multiple ports from a single director while maintaining diversity across directors.

The graph pruning engine 606 processes input parameters, including minimum and maximum numbers of ports to be added, using these constraints to guide the pruning operations. The graph pruning engine 606 supports various port sharing schemes, enabling ports to be pruned based on whether they are unused, configured but inactive, or actively used by other sessions.

For arrays connected over wide-area or metro networks, the graph pruning engine 606 preserves information about diverse physical paths that do not share common points of failure. This ensures the subsequent path selection can identify truly redundant paths for maintaining fault tolerance during migration.

The graph pruning engine 606 provides critical functionality for enabling non-disruptive port selection by preparing an optimized graph representation that captures both physical connectivity constraints and logical requirements of the storage network. The pruned graph enables the path selection engine to identify optimal diverse paths while maintaining redundancy requirements for ongoing migration sessions.

The graph pruning engine's pruning capabilities eliminate error-prone manual port selection while ensuring optimal use of available network bandwidth through its sophisticated filtering of directors, ports, and their interconnections. The resulting pruned graph provides the foundation for automated discovery and configuration of optimal migration paths that meet all diversity and sharing constraints.

In embodiments, the controller 142 can include a path selection processor 608 that receives the pruned graph from the graph pruning engine 606 and implements sophisticated algorithms to identify optimal diverse paths for ongoing data migration sessions. The path selection processor 608 can utilize a modified Dijkstra algorithm to find minimum cost augmenting paths between source and target arrays while maintaining path diversity requirements.

When processing an ongoing migration session, the path selection processor 608 first analyzes the pruned graph to identify potential paths between free nodes that meet the configured diversity constraints. The path selection processor 608 implements an iterative approach where it repeatedly finds and selects minimum cost augmenting paths until either sufficient diverse paths are discovered or no more valid paths can be found.

In embodiments, the path selection processor 608 supports both symmetric and asymmetric port configurations between source and target arrays. For symmetric configurations, the path selection processor 608 ensures an equal number of ports are selected on both arrays. For asymmetric configurations, it enables fan-in scenarios with more ports on the source array or fan-out scenarios with more ports on the target array, while maintaining equivalent aggregate bandwidth.

The path selection processor 608 handles high-density directors available in newer arrays by allowing multiple ports to be selected from individual directors while preserving path diversity requirements across directors. The path selection processor 608 also supports different port sharing schemes, selecting paths based on whether ports are unused, configured but inactive, or actively being used by other sessions.

For arrays connected over wide-area or metro networks, the path selection processor 608 ensures selected paths do not share common points of failure by maintaining diversity in the physical network topology. The path selection processor 608 evaluates path costs based on port utilization and performance characteristics to optimize bandwidth usage across the selected paths.

The path selection processor 608 provides critical functionality for enabling non-disruptive port selection by identifying optimal diverse paths that meet both physical connectivity constraints and logical requirements of the storage network. The path selection processor's path selection capabilities eliminate error-prone manual port selection while ensuring optimal use of available network bandwidth through its sophisticated analysis of directors, ports, and their interconnections.

The path selection processor 608 implements validation checks to ensure the selected paths meet minimum and maximum port requirements, diversity constraints, and bandwidth requirements before modifying the RDF group configuration. If sufficient valid paths cannot be found, the path selection processor 608 returns a failure indication to prevent invalid configurations In embodiments, the controller 142 can include an RDF group processor 610 that receives the selected paths from the path selection processor 608 and implements sophisticated algorithms to modify the RDF group configuration for ongoing data migration sessions. When processing an ongoing migration session, the RDF group processor 610 first validates that the selected paths meet all configured requirements, including minimum and maximum port constraints, diversity requirements, and bandwidth specifications.

The RDF group processor 610 implements three distinct port-sharing schemes based on configured policies. For exclusive use, the RDF group processor 610 ensures that selected ports are not being used by any configured sessions. For inactive sharing, it allows ports to be shared with inactive sessions. For full sharing, the RDF group processor 610 enables ports to be shared with any configured, active, or inactive sessions.

For arrays connected over wide area or metro networks, the RDF group processor 610 maintains diversity in the physical network topology when modifying the RDF group configuration. The RDF group processor 610 evaluates port utilization and performance characteristics to optimize bandwidth usage across the selected paths. The RDF group processor 610 supports both symmetric and asymmetric port configurations, enabling fan-in scenarios with more ports on the source array or fan-out scenarios with more ports on the target array while maintaining equivalent aggregate bandwidth.

The RDF group processor 610 handles high-density directors available in newer arrays by managing multiple ports from individual directors while preserving path diversity requirements across directors. The processor 610 prevents mixing of different port types within the same RDF group, selecting less preferred port types only if insufficient preferred type ports are available.

The RDF group processor 610 provides critical functionality for enabling non-disruptive port selection by carefully managing RDF group modifications to maintain continuous data migration operations. The processor's sophisticated port management capabilities eliminate error-prone manual port selection, ensuring optimal use of available network bandwidth through the automated configuration of directors, ports, and their interconnections. If the configuration cannot be appropriately modified, the RDF group processor 610 returns a failure indication to prevent invalid configurations.

Although what is described herein shows details of logic, hardware, and circuitry 600 that may reside in the controller 142, all or portions of the illustrated components may also reside elsewhere in the storage array (e.g., one or more of the storage array's components 108 of FIG. 1).

The following text includes details of a method(s) or a flow diagram(s) per embodiments of this disclosure. For simplicity of explanation, each method is depicted and described as a set of alterable operations. Additionally, one or more operations can be performed in parallel, concurrently, or in a different sequence. Further, not all the illustrated operations are required to implement each method described by this disclosure.

Figure 7:
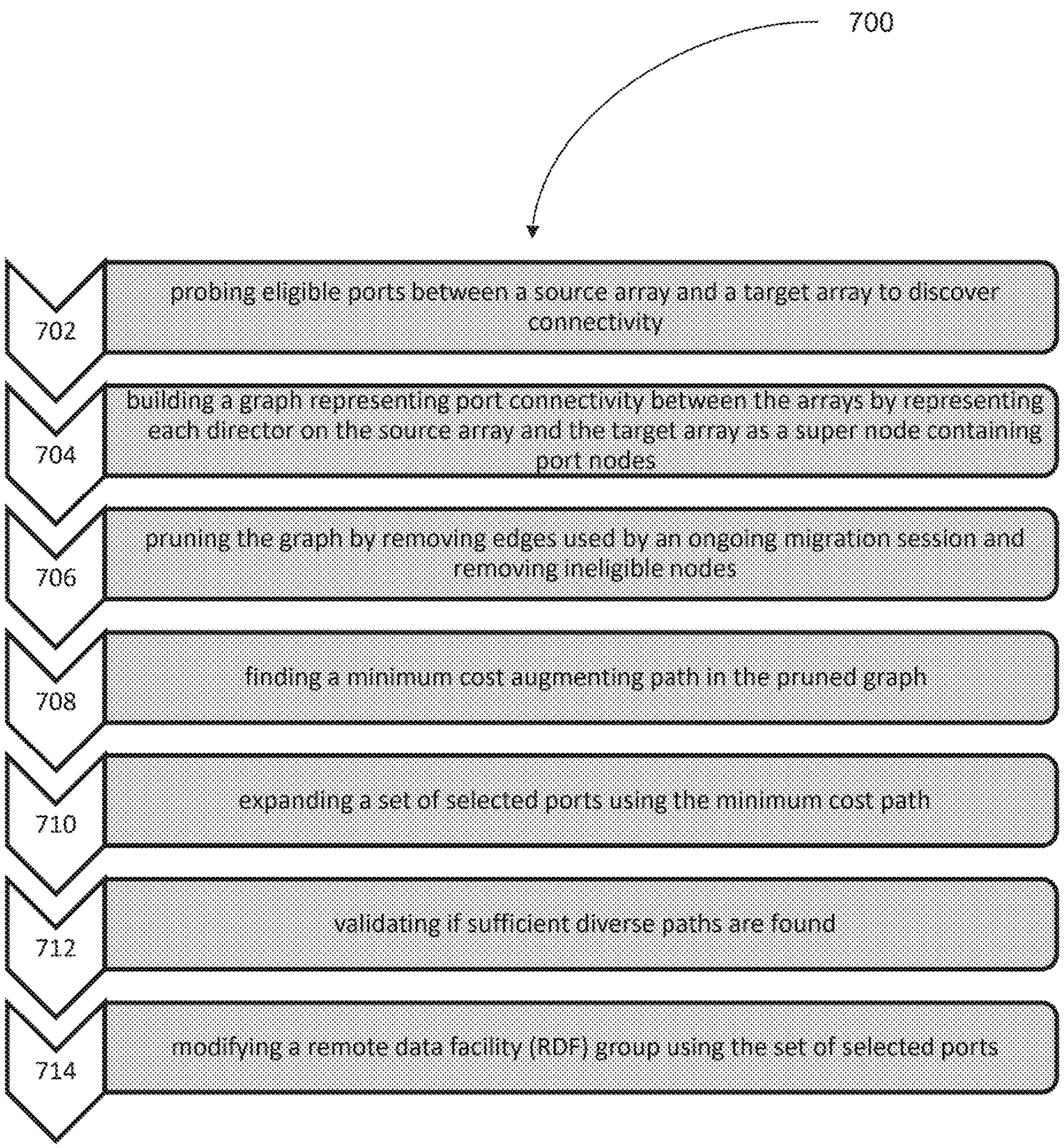
FIG. 7 is a flow diagram of a method for optimizing port selection in ongoing data migration between storage arrays per embodiments of the present disclosure.

Regarding FIG. 7, a method 700 relates to optimizing port selection in ongoing data migration between storage arrays. In embodiments, the controller 142 of FIG. 1 can perform all or a subset of operations corresponding to the method 700.

For example, the method 700, at 702, can include probing eligible ports between a source array and a target array to discover connectivity. At 704, the method 700 can include building a graph representing port connectivity between the arrays by representing each director on the source array and the target array as a super node containing port nodes. The method 700, at 706, can include pruning the graph by removing edges used by an ongoing migration session and removing ineligible nodes. Additionally, the method 700, at 708, can include finding a minimum cost augmenting path in the pruned graph. At 710, the method 700, can include expanding a set of selected ports using the minimum cost path. Further, the method 700, at 712, can include validating if sufficient diverse paths are found. At 714, the method 700 can include modifying a remote data facility (RDF) group using the set of selected ports.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be written in any programming language, including both compiled and interpreted languages. The computer program can have any deployed form, including a stand-alone program, subroutine, element, or other units suitable for a computing environment. One or more computers can execute a deployed computer program.

One or more programmable processors can perform the method steps by executing a computer program that implements the concepts described herein, operating on input data and generating output. An apparatus can also perform the steps of the method. The apparatus can be a special-purpose logic circuitry. For example, the circuitry is an FPGA (field-programmable gate array) or an ASIC (application-specific integrated circuit). Subroutines and software agents can refer to portions of a computer program, the processor, unique circuitry, software, or hardware that implement that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all non-volatile memory forms, such as semiconductor memory devices. The information carriers can, for example, be EPROM, EEPROM, flash memory devices, magnetic disks, internal hard disks, removable disks, magneto-optical disks, CD-ROMs, or DVD-ROMs. Additionally, the processor and memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer, such as interacting with a user interface element. Additionally, various types of devices can facilitate user interaction. Other devices can, for example, provide feedback to the user in any form of sensory feedback (e.g., visual, auditory, or tactile feedback). For example, user input can take various forms, including acoustic, speech, or tactile input.

A distributed computing system with a back-end component can also implement the techniques described above. The back-end component can, for example, be a data server, a middleware component, or an application server. Further, a distributing computing system with a front-end component can implement the above-described techniques. The front-end component can, for example, be a client computer with a graphical user interface, a web browser through which a user can interact with an example implementation, or other graphical user interfaces for a transmitting device. Finally, the system's components can interconnect using any form or medium of digital data communication, such as a communication network. Examples of communication networks include a local area network (LAN), a wide area network (WAN), the Internet, a wired network, or a wireless network.

The system can include one or more clients and one or more servers. The client and server (e.g., a remote server) can interact through a communication network. For example, a client-server relationship can arise when computer programs run on the respective computers and interact with each other in this manner. Furthermore, the system can include one or more storage arrays that deliver distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser, a telephone, an IP phone, a mobile device (e.g., a cellular phone, a personal digital assistant (PDA) device, a laptop computer, an electronic mail device), or other communication devices. The browser device includes, for example, a computer (e.g., desktop computer, laptop computer) with a World Wide Web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:

probing eligible ports between a source array and a target array to discover connectivity;

building a graph representing port connectivity between the arrays by representing each director on the source array and the target array as a super node containing port nodes;

pruning the graph by removing edges used by an ongoing migration session and removing ineligible nodes;

finding a minimum cost augmenting path in the pruned graph;

expanding a set of selected ports using the minimum cost path;

validating if sufficient diverse paths are found; and modifying a remote data facility (RDF) group using the set of selected ports.

2. The method of claim 1, further comprising:

removing edges corresponding to director ports already used in the ongoing migration session; and removing nodes that do not meet diversity constraints between the source and target arrays using one or more port selection policies.

3. The method of claim 1, further comprising:

representing each director as a super node;

representing each port on a director as a node within the corresponding super node; and connecting nodes based on discovered connectivity between ports.

4. The method of claim 1, further comprising:

receiving a minimum number of ports to be added;

receiving a maximum number of ports to be added; and validating the selected set of ports meets the minimum and maximum constraints.

5. The method of claim 1, further comprising:

building a directed graph with unmatched links from source to target nodes;

adding dummy source and sink nodes; and finding the minimum cost path between the source and target nodes.

6. The method of claim 1, further comprising:

selecting multiple ports from a single director; and maintaining path diversity across directors.

7. The method of claim 1, further comprising:

implementing asymmetric port selection between source and target arrays;

selecting different numbers of ports on source and target arrays; and maintaining equivalent aggregate bandwidth.

8. The method of claim 1, further comprising:

implementing a fan-out configuration with minimum ports on the source array and more ports on the target array or a fan-in configuration with more ports on the source array and minimum ports on the target array.

9. The method of claim 1, further comprising:

selecting ports according to one of:

exclusive use with ports not shared with any configured sessions, inactive sharing with ports shared with inactive sessions, or full sharing with ports shared with any active or inactive sessions.

10. The method of claim 1, further comprising:

preventing mixing of different port types within the same RDF group;

selecting less preferred port types if insufficient preferred type ports are available; and non-disruptively modifying the RDF group by adding newly discovered ports and pruning failed ports from the RDF group.

11. An apparatus with a memory and processor, the apparatus configured to:

probe eligible ports between a source array and a target array to discover connectivity;

build a graph representing port connectivity between the arrays by representing each director on the source array and the target array as a super node containing port nodes;

prune the graph by removing edges used by an ongoing migration session and removing ineligible nodes;

find a minimum cost augmenting path in the pruned graph;

expand a set of selected ports using the minimum cost path;

validate if sufficient diverse paths are found; and modify a remote data facility (RDF) group using the set of selected ports.

12. The apparatus of claim 11, further configured to:

remove edges corresponding to director ports already used in the ongoing migration session; and remove nodes that do not meet diversity constraints between the source and target arrays using one or more port selection policies.

13. The apparatus of claim 11, further configured to:

represent each director as a super node;

represent each port on a director as a node within the corresponding super node; and connect nodes based on discovered connectivity between ports.

14. The apparatus of claim 11, further configured to:

receive a minimum number of ports to be added;

receive a maximum number of ports to be added; and validate the selected set of ports meets the minimum and maximum constraints.

15. The apparatus of claim 11, further configured to:

build a directed graph with unmatched links from source to target nodes;

add dummy source and sink nodes; and find the minimum cost path between the source and target nodes.

16. The apparatus of claim 11, further configured to:

select multiple ports from a single director; and maintain path diversity across directors.

17. The apparatus of claim 11, further configured to:

implement asymmetric port selection between source and target arrays;

select different numbers of ports on source and target arrays; and maintain equivalent aggregate bandwidth.

18. The apparatus of claim 11, further configured to:

implement a fan-out configuration with minimum ports on the source array and more ports on the target array or a fan-in configuration with more ports on the source array and minimum ports on the target array.

19. The apparatus of claim 11, further configured to:

select ports according to one of:

exclusive use with ports not shared with any configured sessions, inactive sharing with ports shared with inactive sessions, or full sharing with ports shared with any active or inactive sessions.

20. The apparatus of claim 11, further configured to:

prevent mixing of different port types within the same RDF group;

select less preferred port types if insufficient preferred type ports are available; and non-disruptively modify the RDF group by adding newly discovered ports and pruning failed ports from the RDF group.

* * * * *